United States Patent [19]
Pierce

[11] 3,716,209
[45] Feb. 13, 1973

[54] FLUID DYNAMIC LIFT GENERATING OR CONTROL FORCE GENERATING STRUCTURES

[75] Inventor: Donald Pierce, Aldershot, Hampshire, England

[73] Assignee: Minister of Technology in Her Britannic Majesty's Government of the United Kingdom of Great Britain and Northern Ireland, London, England

[22] Filed: June 1, 1970

[21] Appl. No.: 42,082

[52] U.S. Cl............................244/123, 244/44
[51] Int. Cl...............................B64c 3/48
[58] Field of Search........................244/123, 44

[56] References Cited

UNITED STATES PATENTS

| | | |
|---|---|---|
| 3,179,357 | 4/1965 | Lyon ........................... 244/44 |
| 1,880,019 | 9/1932 | Harper ......................... 244/44 |
| 2,010,549 | 8/1935 | Maring ......................... 244/44 |
| 2,022,806 | 12/1935 | Grant ........................... 244/44 |
| 2,223,335 | 11/1940 | Stewart ........................ 244/44 |
| 2,523,427 | 9/1950 | Hampshire ..................... 244/44 |

*Primary Examiner*—Milton Buchler
*Assistant Examiner*—Stephen G. Kunin
*Attorney*—Cameron, Kerkam, Sutton, Stowell & Stowell

[57] ABSTRACT

In a fluid dynamic structure having an outer wall or skin defining a fluid dynamic profile part of the outer wall is flexible and has movable support apparatus and power apparatus are provided for effecting movement of the support apparatus and the flexible part whereby the fluid dynamic profile of the structure is changed.

The invention is applicable to the leading edge of an aircraft wing and also to auxiliary control surfaces such as flaps and ailerons.

9 Claims, 5 Drawing Figures

FLUID DYNAMIC LIFT GENERATING OR CONTROL FORCE GENERATING STRUCTURES

The present invention relates to fluid dynamic lift generating or control force generating structures.

In one important aspect the invention concerns aircraft wings but is equally applicable to other lift or control force generating aircraft structures such as a tailplane, rudder, flap, aileron or elevator.

The main wing structure of an aircraft is designed to have efficient aerodynamic characteristics, i.e. it is shaped to provide the required lift with the least possible drag. The aerodynamic shape of the wing is necessarily a comprise in that the most efficient profile for high speed flight, say typical aircraft cruising speed, differs from that which is required to provide the desired lift and drag characteristics at low speeds such as at take off and landing.

With a view to overcoming this difficulty aircraft wings are provided with various movable auxiliary control surface structures such as trailing edge and/or leading edge flaps. These flaps are normally held in a retracted position at cruising flight speed but at landing or take off speeds are extended to change the overall profile of the wing/control surface structure combination thereby altering the airflow over it and generating additional lift.

Also, other conventional auxiliary control surface structures such as ailerons, elevators and rudder are provided which are movable to generate, aerodynamically, control forces to enable an aircraft to be maneuvered about roll, pitch and yaw axes.

The provision of such auxiliary control surface structures and the necessary power means for moving them entails additional weight and complication and therefore affects the overall economic efficiency of an aircraft.

For aircraft capable of flight at high speed when local air flow velocities are supersonic and shock waves may normally be present, which may involve a loss of lift and a high drag, it would be desirable if the onset of such shock waves could be delayed and/or their strength reduced.

The present invention has for an object to provide an improved fluid dynamic lift generating or control force generating structure.

In a fluid dynamic lift generating or control force generating structure having an outer wall or skin defining a fluid dynamic profile and a rigid internal structure, according to the present invention, part of the outer wall or skin is flexible and has movable support means and there is provided power means for applying a control force to effect both movement of said support means and flexure of said flexible part and thereby to change the fluid dynamic profile of the structure.

In the case of an aircraft wing the support means and power means may together comprise an extensible power actuator, such as an hydraulic jack, pivotally secured at its one end to the rigid internal wing structure and at its other end pivotally to the flexible part of the outer wall or skin. By changing the length of the extensible member its other end is moved to cause flexure of the flexible part and thus to effect profile change.

The support means may also comprise at least one frame or arm member pivotally secured at its one end to the flexible part at a movable connecting point and at its other end pivotally to a fixed or movable connecting point.

Thus, in a simple case the leading edge section of a wing is formed of flexible and resilient sheet material capable of supporting the aerodynamic forces involved. A swinging arm is pivotally secured at its one end to a rigid part of the internal wing structures, such as the main spar, and is pivotally supported at its other end at the inner surface of the flexible leading edge section. Power means such as an hydraulic jack secured to the internal wing structure apply a control force either internally to the flexible section or to the swinging arm and as a result said other end of the arm moves in an arc about its one end and the aerodynamic profile of the leading edge is changed.

In practice, the use of a single support means such as a swinging arm may lead to design difficulties and limitations and in some cases may not permit the desired full range of profile changes to be achieved.

To overcome such limitations two or more swinging arms may be provided each pivotally secured at its inner end to the fixed internal wing structure and at its outer end to the inner surface of the flexible leading edge section. A frame member supports the flexible section internally at its front region and is pivotally mounted on the fixed internal wing structure. The rearmost regions of the flexible leading edge section are supported to slide, preferably externally, with respect to the surface of the remaining fixed section of the wing. Power means such as an hydraulic jack are operative between the fixed internal wing structure and the frame member to cause the latter to move about its pivot point. As a result the aerodynamic profile of the flexible leading edge section is changed in accordance with the resulting arcuate movement of the outer ends of the swinging arms about their inner ends. The swinging arms provide support to the flexible leading edge section in addition to defining its profile.

In an alternative arrangement the inner ends of the arms are pivotally supported on a movable member, such as a rack, which is movable by power means with respect to the fixed internal wing structure to change the disposition of the arms and hence change the profile of the leading edge section.

A combination of movement of a frame member secured to the flexible section and movement of the inner ends of the arms may also be used to effect profile changes.

In come cases the arms may comprise spring members such as leaf springs in which case the manner of their attachment at their inner and/or outer ends need not be pivotal.

The invention is also applicable to the trailing edge of a wing or to other aircraft lift or control force generating structures such as the tailplane, rudder, ailerons, elevators or flaps.

In a further aspect the invention comprises means whereby the aerodynamic profile of an aircraft control surface structure may be changed as disclosed above and having provision for creating a slot for airflow between the opposed surfaces, say the lower and the upper surfaces, of a lift or control surface structure.

Thus, an aircraft lift or control force generating structure as defined above according to this invention may itself be provided with a leading edge portion which is movable in both senses between a retracted position in which it fits snugly against said structure and forms therewith a continuous aerodynamic surface and an extended position in which a slot is formed between it and said structure.

Various embodiments of the invention as applied to the leading edge of an aircraft main wing will now be described by way of example with reference to FIGS. 1 to 5 of the accompanying diagrammatic drawings, wherein.

Figure 1:
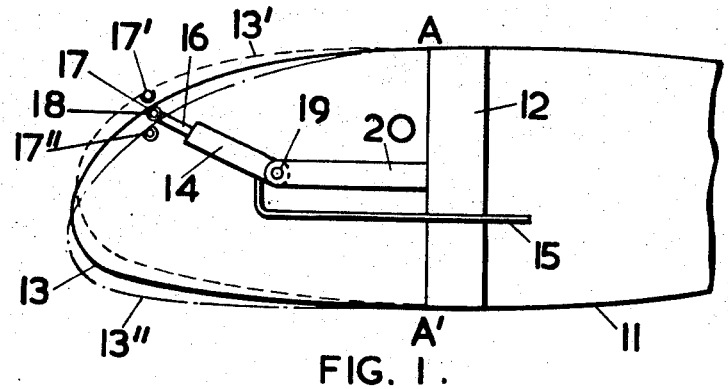
FIG. 1 is a side elevation of the leading edge portion of an aircraft main wing embodying one form of the present invention.

Referring first to FIG. 1, part of an aircraft main wing 11 has a main spar 12 and a leading edge portion 13 secured to the main wing at A, A¹. The leading edge portion 13 is formed of flexible sheet material and has sufficient inherent stiffness to support the aerodynamic forces involved but is also supported by a set of power jacks, one of which is shown at 14. The jacks 14 are each connected to a power supply 15 and have piston arms 16. The piston arms 16 are each pivotally secured at 17 to the inner surface of the flexible portion 13 at brackets 18 and the jacks 14 are pivotally secured at 19 at their inner ends to a forward structural extension 20 from the main spar 12. The leading edge portion 13 defines the aerodynamic profile of the leading edge of the wing.

In operation the jacks 14 are operated to extend or retract the piston arms 16 the adjustment being made in accordance with airspeed. Thus for high speed flight conditions the piston arms 16 are extended so that the pivot points 17 are at 17¹. The flexible leading edge portion 13 now takes up a profile as indicated by the dotted lines 13¹. At low speed conditions for landing or take off the piston arms 16 are retracted so that the pivot points 17 are at 17¹¹. The flexible leading edge portion 13 now takes up a profile as indicated by the chain dotted lines 13¹¹. It will be noted that the change in profile of the leading edge portion 13 is achieved wholly by flexing of the portion 13.

Figure 2:
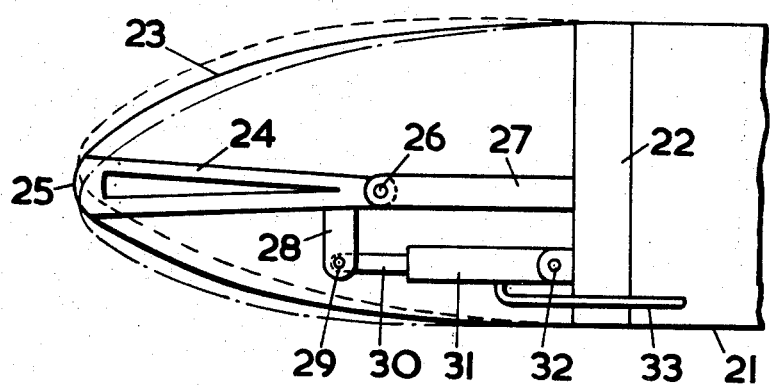
FIG. 2 is a side elevation of a second embodiment of the invention.

At FIG. 2 the general arrangement is similar to that of FIG. 1. Part of an aircraft main wing 21 has a main spar 22 and a leading edge portion 23 the latter comprising flexible sheet material having sufficient inherent stiffness to support the aerodynamic forces involved. A swinging frame member 24 is secured at its outer end to the flexible leading edge portion 23 at 25 and is pivotally supported at 26 to a forward extension 27 from the main spar 22. The frame 24 has a crank arm 28 which is pivotally connected at 29 to the piston arm 30 of a power jack 31. The jack 31 is pivotally mounted at 32 on the main spar 22 and has a connection 33 to a power source.

With this arrangement extension or retraction of the piston arm causes the frame 24 to swing up and down, respectively, with consequent change in the profile of the leading edge portion 23. The profile change is accommodated by flexing of the portion 23 between the frame member 24 and the upper and lower surface of the main wing respectively.

Figure 3:
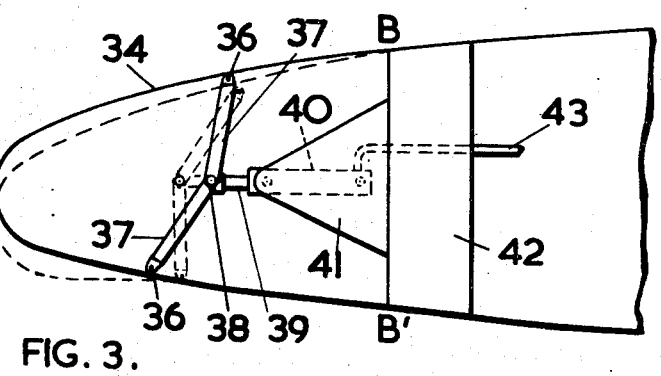
FIG. 3 is a side elevation view similar to that of FIGS. 1 and 2 of a third embodiment of the invention.

Referring now to FIG. 3 in which the general arrangement is similar to that of FIGS. 1 and 2, a flexible leading edge portion 34 is secured to the main wing 35 at B, B¹ and is supported at pivot points 36 by a pair of swinging links 37 which latter are pivotally supported at 38 at their inner ends to a piston arm 39 extending from a power jack 40. The jack 40 is rigidly secured to a fixed frame 41 extending forwards from a main spar 42 and has a connection 43 to a power source.

The piston arm 39 is shown in a retracted position (full lines) and an extended position (dotted lines) and in these positions the links 37 take up corresponding positions as shown. As a result the profile of the leading edge portion 34 will be as shown in full lines with the piston arm 39 retracted and as shown in dotted lines with the piston arm 39 extended.

Whilst the examples described above with reference to FIGS. 1, 2 and 3 may provide sufficient profile variation for simple cases, in other cases where operating conditions are more severe and/or more extensive profile variations are desirable an alternative form of construction will be required.

Figure 4:
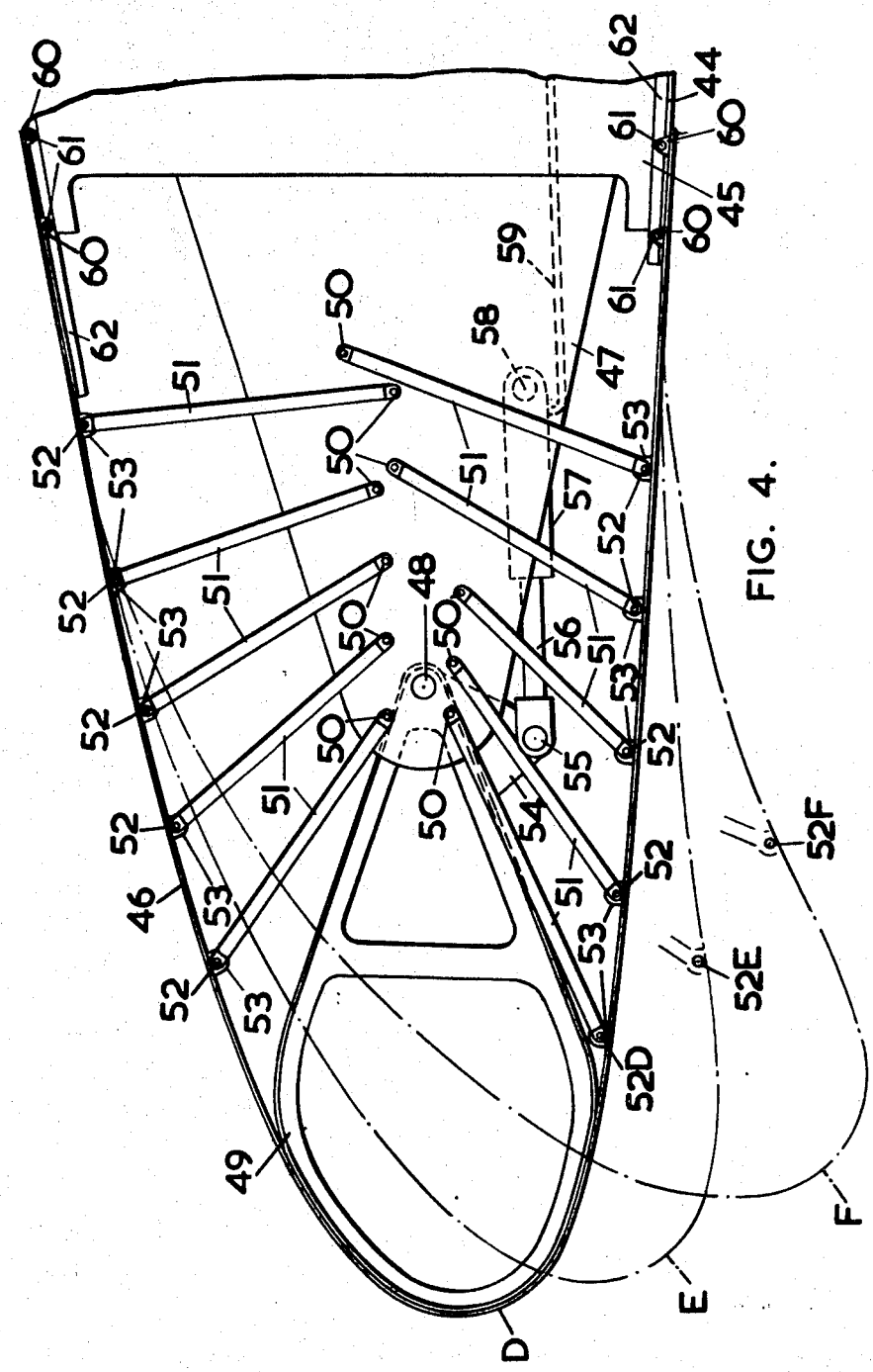
FIG. 4 is a side elevation of still another construction embodying the invention for use where operating conditions are more severe, and/or more extensive profile variations are desirable, than in the case of the arrangements illustrated in FIGS. 1, 2 and 3.

Such construction is shown at FIG. 4 and as shown therein an aircraft main wing 44 has a main spar 45 and a flexible leading edge portion 46. A frame 47 extending forwards from the main spar provides pivotal support at 48 for a swinging frame 49 which supports the flexible portion 46 at its foremost region. The frame 47 also provides pivotal support at 50 . . . 50 for the inner ends of a set of swinging support arms 51 . . . 51. Each arm 51 is pivotally supported at 52 at its outer end to brackets 53 secured to the flexible portion 46. The swinging frame 49 has a crank arm 54 pivotally secured at 55 to the piston arm 56 of a power jack 57. The jack 57 is pivotally mounted at 58 to the frame 47 and has a connection 59 to a power source. The flexible portion 46 has brackets 60 . . . 60 holding retaining pins or rollers 61 . . . 61 which latter engage flanged member 62 62 secured to the upper and lower surface regions of the main wing 44. By this arrangement the rearmost regions of the flexible portion 46 can slide with respect to the main wing but is retained in close contact with it. The location of the fixed pivot points 50 . . . 50 and hence the length of the respective arms 51 is determined by the profile changes which are required. Thus in this case for aerodynamic considerations, the profile of the flexible leading edge portion 46 is required to be varied from an upper condition D through an intermediate condition E to a lower condition F. The determination of the position of the fixed pivot point for the lower forward arm 51 is shown by way of example where its outer pivot 52 is shown at 52D, 52E and 52F, respectively. The point where the two bisectors of 52D − 52E and 52E − 52F meet is the position for the fixed pivot 50 for this particular arm 51. The position of the respective fixed pivots for the other arms 51 is determined in a like manner.

In operation the jack 57 is operative to hold the swinging frame 49 in condition D at cruise conditions. For lower flight speeds the jack is operative to move the swinging frame 49 through condition E until at landing or take off speed it is in condition F. It will be seen that as the swinging frame 49 moves the arms 51 will swing about their fixed pivots 50 and the position of their outer ends will determine the profile of the flexible leading edge portion 46 which they support. At the same time the rearmost regions of the flexible portion 46 will slide with respect to the main wing.

With this arrangement the degree of profile variation of the leading edge which is possible enables the aerodynamic efficiency of the main wing leading edge portion combination over an aircrafts speed range to be higher than in the case of a fixed profile arrangement.

Figure 5:
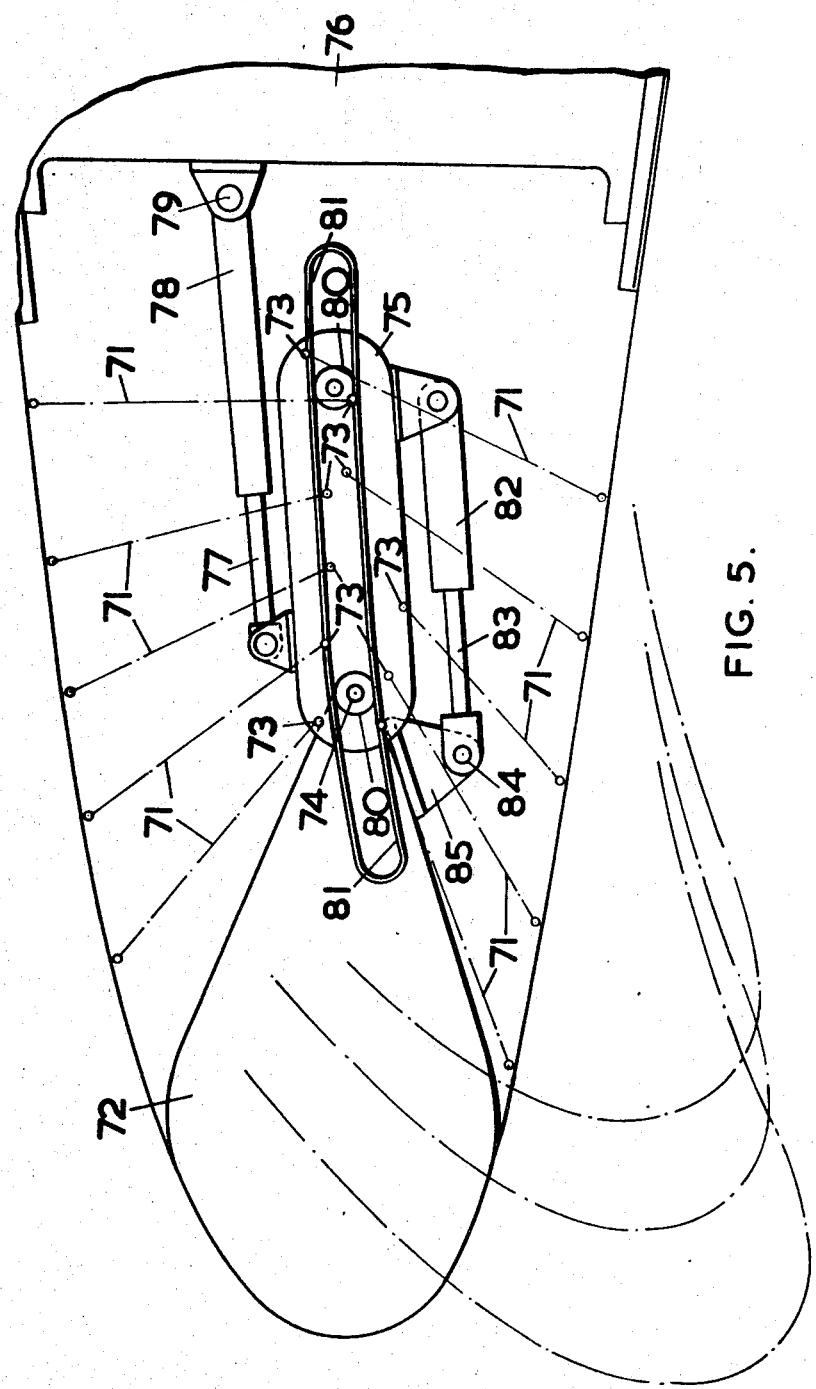
FIG. 5 is a side elevaiton of a modificaiton of the structure illustrated in FIG. 4.

Referring now to FIG. 5, this arrangement is basically similar to that described above with reference to FIG. 4 with the exception that the swinging arms 71 and the swinging frame 72 are pivotally supported at 73 . . . 73 and 74, respectively on a carrier 75 which is movable with respect to the main spar 76. The carrier is supported by the piston rod 77 of a control jack 78 pivotally supported on the main spar 76 and 79. The carrier 75 has trunnions 80 which engage guide slots as at 81 in side plates (not shown) carried by the main spar 76. The carrier 75 also supports a secondary control jack 82 having a piston arm 83 pivotally secured at 84 to a crank 85 extending from the swinging frame 72.

In operation actuation of the control jack 78 causes motion of the carrier 75, the trunnions 80 running along the guide tracks 81. Extension or retraction of the whole leading edge section within the limits of the guide tracks 81 is thus possible. Also, actuation of the secondary control jack 82 causes angular movement of the swinging frame 72 about the pivot point 74 and corresponding swinging motion of the arms 71 whereby the profile of the leading edge can be changed to take up positions as shown in chain dotted lines. The jacks 78 and 82 may be operated simultaneously.

Whilst the invention has been described above by way of example as applied to the leading edge region of an aircraft main wing it is equally applicable to the trailing edge region or to other aerodynamic control force generating structures such as a tailplane, rudder, flap, aileron or elevator.

Also, recent advances in aerodynamic fluid flow theory have enabled aerofoils to be designed which for a limited region of an aircraft's design speed range provide the required lift and low drag characteristics. The aerofoil shape chosen is therefore that which will give required lift and low drag at the speed range in which the aircraft operates most frequently i.e. at or near the cruising speed. This means that at other aircraft speeds and particularly at landing and take off speeds the desired high lift may not be possible with this shape of aerofoil and the design is compromised. By the provision of means according to the invention whereby the profile of an aerofoil may be changed the overall aerodynamic efficiency of an aerofoil structure can be improved as by these profile changes the shape of the aerofoil can be made to be more nearly an ideal shape at different airspeeds. Such profile changes are not limited only to the leading or trailing edge regions but can be applied at other regions of an aerofoil surface to change its local profile.

In an alternative arrangement (not illustrated) the rear part of the flexible portion, instead of sliding over the main wing portion as in FIGS. 4 and 5, may be supported on a swinging frame to move arcuate fashion within the main wing portion.

Design calculations show that the application of the invention to the leading edge of an aircraft wing need not entail any weight penalty.

It is to be noted that to allow for wing flexure the various pivotal connections may comprise universal joints.

The invention has a particular advantage in the case of aircraft having variable sweep wings wherein aerodynamic inefficiencies normally attendent upon change of wing sweep may to some extent be reduced by changes of wing profile by means of the invention.

The invention is also applicable to hydrodynamic control force generating structures.

I claim:

1. A fluid dynamic structure comprising
a primary outer wall defining part of a fluid dynamic profile,
a rigid internal first structure supporting said primary outer wall,
a control surface structure having a secondary outer wall which is flexible in at least one region thereof, an internal secondary structure supporting said secondary outer wall, connecting means movably connecting said secondary structure to said rigid internal first structure, and
power means operably connected between said rigid internal first structure and said secondary structure operative to apply a control force to effect flexure of said at least one flexible region of said control surface secondary outer wall, said secondary structure comprising a plurality of swinging arms connected at their one ends by said connecting means to said rigid internal first structure and at their other ends to said secondary outer wall, at least some of the connections between said swinging arms and said secondary outer wall being pivotal.

2. A fluid dynamic structure as claimed in claim 1 wherein said secondary structure and said power means together comprise an extensible power actuator which has pivot connections pivotally securing said actuator at its one end to the rigid internal first structure and at its other end to the flexible part of said secondary outer wall.

3. A fluid dynamic structure as claimed in claim 1 wherein at least one region of said control surface secondary outer wall is in sliding relationship with part of the primary outer wall.

4. A structure as claimed in claim 3 wherein said connecting means also comprises a carrier member movably mounted on said rigid internal first structure and to which said internal secondary structure is pivotally attached, and said power means comprises first power means operably connected between said secondary structure and said carrier member and secondary power means operably connected between said carrier member and said rigid internal first structure.

5. A fluid dynamic structure as claimed in claim 1 wherein the power means comprises an hydraulic jack.

6. A structure as claimed in claim 1 wherein said internal secondary structure comprises a primary swinging arm supporting a non-flexible region of said control surface secondary outer wall, and a plurality of secondary swinging arms pivotally connected at their one ends by said connecting means to said rigid internal first structure and at their other ends to said at least one flexible region of said control surface secondary outer wall.

7. A structure as claimed in claim 6 wherein said power means is operably connected between said rigid internal first structure and said primary swinging arm.

8. A structure as claimed in claim 6 wherein said primary swinging arm is attached at its one end to an extremity of maximum curvature of said control surface secondary outer wall.

9. A fluid dynamic structure as claimed in claim 1 wherein said control surface structure is a leading edge flap.

* * * * *